United States Patent [19]

Herbst et al.

[11] Patent Number: 4,904,122
[45] Date of Patent: Feb. 27, 1990

[54] ANCHORING DEVICE, SUCH AS A ROCK ANCHOR

[75] Inventors: Thomas Herbst, Wessling; Lorenz Schnitzler, Pöcking, both of Fed. Rep. of Germany

[73] Assignee: Dyckerhoff & Widmann Aktiengesellschaft, Munich, Fed. Rep. of Germany

[21] Appl. No.: 226,758

[22] Filed: Aug. 1, 1988

[30] Foreign Application Priority Data

Aug. 6, 1987 [DE] Fed. Rep. of Germany ....... 3726098

[51] Int. Cl.⁴ ............................................. E21D 21/00
[52] U.S. Cl. ..................... 405/260; 405/259; 411/5; 411/8
[58] Field of Search ..................... 411/2, 3, 5, 8, 14; 405/259, 260, 261

[56] References Cited

U.S. PATENT DOCUMENTS

| | | | |
|---|---|---|---|
| 1,380,395 | 6/1921 | Korach | 411/3 |
| 2,394,812 | 2/1946 | Seitz | 411/5 |
| 4,410,296 | 10/1983 | Unrug | 405/259 |
| 4,630,971 | 12/1986 | Herbst et al. | 405/259 X |

FOREIGN PATENT DOCUMENTS

| | | |
|---|---|---|
| 0190460 | 8/1986 | European Pat. Off. . |
| 1005474 | 3/1953 | Fed. Rep. of Germany . |
| WO84/01005 | 3/1984 | PCT Int'l Appl. ................. 405/259 |

Primary Examiner—Randolph A. Reese
Assistant Examiner—Arlen L. Olsen
Attorney, Agent, or Firm—Toren, McGeady & Associates

[57] ABSTRACT

An anchoring device, such as a rock anchor, includes an anchor rod with force transmission ribs projecting outwardly from its outside surface. An anchor nut is in threaded engagement with the rod and has at least an axially extending portion formed of a material having lesser strength than the material of the rod. The anchor nut has at least two axially extending portions spaced apart by cuts through the nut, which cuts extend transversely of the nuts central axis. The portions follow one another in the central axis direction with at least the portion closer to the body into which the anchor rod extends having the lesser strength. The nut portions are dimensioned so that the portion closer to the body loses its force locking engagement with the ribs on the rod and its threads shear off when a predetermined load is exceeded. The nut portions are interconnected by narrow webs remaining after the cuts are made in the nut separating the portions. The webs cannot transmit the anchor force when the predetermined load is exceeded, and, therefore, they act as breaking points with the two portions moving toward one another and closing off the cuts. The closure of the cuts is visible and signals that the predetermined load has been exceeded, accordingly, steps can be taken to secure the stability of the body into which the anchoring device is inserted.

6 Claims, 2 Drawing Sheets

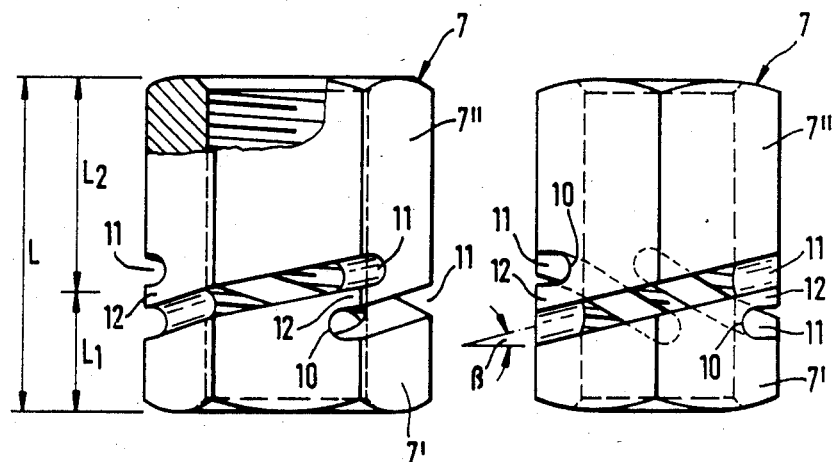
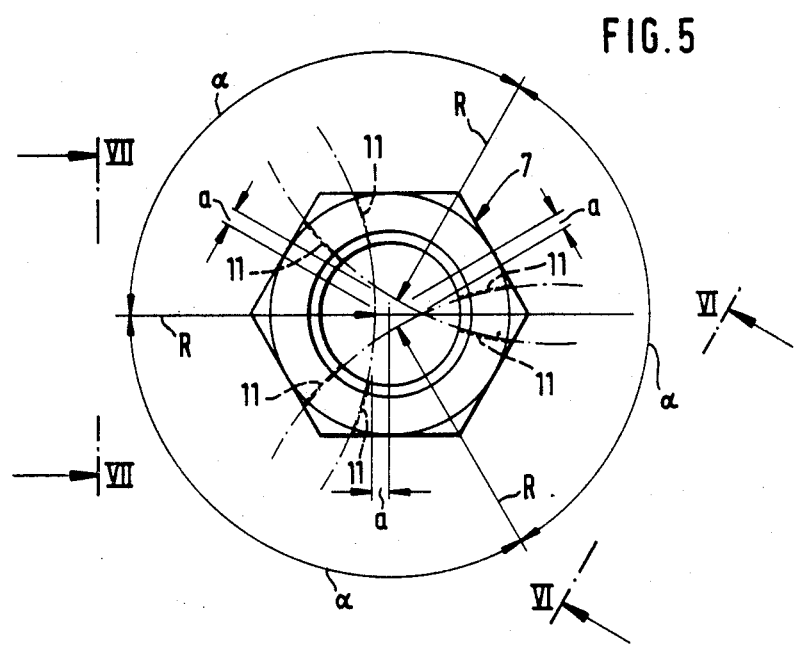

ANCHORING DEVICE, SUCH AS A ROCK ANCHOR

BACKGROUND OF THE INVENTION

The present invention is directed to an anchoring device, such as a rock anchor, including a tension member formed by a steel anchor rod having ribs extending along a helical line and forming at least a partial or interrupted thread. An anchor nut is threaded onto the portion of the anchor rod extending outwardly from a body to be anchored and is supported against the body. The nut has at least two axially extending portions, each with an internal thread. Initially, the anchor nut is positioned on the rod with the portions spaced apart at a given distance. Further, the two portions are not rotatable relative to one another. When a predetermined load is exceeded in the anchoring device, the two portions move toward one another and engage in a force-locking manner with the anchor rod, one after the other.

In driving a tunnel, rock anchors together with concrete pumped into place and arc shaped liner plates are finding increasing use as the standard permanent support for lining or at least forming the external shell for the tunnel. This construction method, which has become known as the "New Austrian Tunnel Construction Method" (NÖT) also includes careful monitoring of the body or strata overlying the tunnel using measuring technology. Devices suitable for such monitoring usually employ means for checking the anchoring force applied by the anchoring device and are very costly. Accordingly, accurate monitoring can take place only at selected cross-sections of a tunnel, though it would be reasonable for safety to monitor between the measurement cross-sections.

It is known to effect simple visual monitoring of the anchoring force at rock anchor devices by additional steps. Thus, in a rock anchor disclosed in DAS 1 005 474, a spring element having a characteristic corresponding to the desired pretensioning of the anchor, is arranged between the anchor nut and a clamping plate. From the degree of deformation of the spring, it can be determined, as the anchor nut is tightened, whether the anchor has been pretensioned to the desired degree or has loosened somewhat. In a rock anchor, disclosed in U.S. Pat. No. 4,410,296, a special washer, used in place of a spring element, is positioned between the anchor nut and the abutment plate. The washer has finger-like protrusions which project diagonally and at various heights. These protrusions are dimensioned for transmitting the allowable anchoring force, however, they break off one after the other when the anchoring force is exceeded, so that the existence of a possible overload on the anchor can be observed visually.

The common feature of these known monitoring devices is that additional means are used to provide a visual monitoring of the anchoring forces, that is, spring elements or washers are used in addition to the anchor nut required in any case. Such additional means requires increased attention on the part of the personnel installing the anchor devices under difficult conditions for underground rock anchors. Moreover, such means afford only a visual monitoring when the determined anchoring force is exceeded, however, they do not afford any further deformation possibilities. Further, in mining operations, there is the problem that considerable deformation in the overlying strata must be allowed without endangering the stability of the tunneled section. Where the mining is performed at great depths, the pressure of the overlying strata is usually only held temporarily by means of rock anchors, while the strata continue to deform constantly. There is also the problem that deformation of the strata must be permitted to a certain extent so that a new state of equilibrium can be reached after the excavation has been performed. However, there is the problem that the permitted deformation may reach an order of magnitude which exceeds the extensibility of the tension members or anchor rods formed of steel. Accordingly, rock anchors with flexible anchorages have become known whereby relative movement occurs between the anchor rod and the anchoring means when a given axially directed tensile force of the anchor rod is exceeded until the force is no longer exceeded.

In an anchoring device of this type, the anchor nut is formed of a material having a greater strength than the material of the anchor rod, note EP OS No. 0 190 460. The anchor nut is formed so that the pitch of the consecutive threads increases in the direction of the axial tensile force, whereby the flanks of the threads in the nut act on the flanks of the ribs on the anchor rod facing the load with the ribs of the anchor rod being gradually sheared off by the threads on the nut when the axial tensile force is exceeded. In this manner, a flexibility is achieved in the anchor device while maintaining a uniform anchoring force. Such device has the advantage that deformations in the body being anchored are possible to a determined extent, however, there is the disadvantage that the anchor rod, although not impaired with respect to its strength issuing from the core cross-section in the region in which the force transmitting ribs are sheared off, can no longer engage in a form-locking connection with the anchor nut.

To make the anchoring force more uniform, this known anchor nut can be formed of at least two portions threadable engageable with the anchor rod, with the portions in spaced relation to one another on the anchor rod and not rotatable relative to one another. Such portions are axially displaceable by a given distance when a predetermined load is exceeded so that they achieve a force-locking engagement with the anchor rod one after the other. By selecting the spacing between the portions of the anchor nut, which spacing may be smaller or larger than a complete thread turn, the threads of the nut portion can be offset when the portions of the nut contact one another and have attained a force-locking engagement with the anchor rod. Accordingly, it is possible that the curve of slippage resistance, which curve is approximately sinusoidal in a one-piece anchor nut, can be superimposed on one another so that a wave trough, a relieving of one portion of the nut, is superimposed on a wave crest, that is, the complete forcelocking of another portion of the nut, and, as a result, the slippage resistance is made more uniform.

SUMMARY OF THE INVENTION

Therefore, the primary object of the present invention is to provide a simple and economical device for testing rock anchors, which aside from the parts required for the functioning of the anchor, such as the anchor plate and the anchor nut, does not require any additional parts equipped with other active means.

In accordance with the present invention, at least an axially extending portion of the anchor nut closer to the body into which the anchor is inserted is formed of a material which has a lesser strength than the material of the anchor rod and is dimensioned and formed so that it loses its force-locking engagement with the ribs of the anchor rod when a predetermined anchoring force is exceeded, with the result that the anchoring force is carried by an additional nut portion or portions spaced more remotely from the body.

The portion of the anchor nut closer to the part of the anchor rod inserted into the body to be secured has a fewer number of threads than the remaining portion or portions of the nut more remote from the anchor rod inserted into the body. When the predetermined force is exceeded, the threads in the closer portion are sheared off.

In a preferred arrangement, the anchor nut is formed monolithically, that is, as a single member, and is provided with predetermined breaking points or webs. These webs fix the distance or spacing between the individual portions of the anchor nut and can be formed by cuts or slots which extend through the wall of the nut and transversely of its central axis.

In an advantageous arrangement, three cuts are formed in the nut and are spaced relative to one another by 120°, that is, each cut extends for approximately 120° around the circumference of the nut. Further, the individual cuts extend at an acute angle relative to the central axis of the anchor nut so that the opposite ends of the cuts overlap one another and are spaced apart in the axial direction of the nut. The cuts in the nut are made along a circular arc with the center of the arc being located adjacent the central axis of the nut.

The present invention is based on the known concept of flexible anchoring. The basic concept of the invention involves connecting at least one nut or at least one portion of a nut at a distance spaced axially from the actual anchoring nut or portion for initially receiving the anchoring force. The nut or portion of the nut, closer to the anchor rod inserted into a borehole in the body to be stabilized or secured by the anchoring device, is dimensioned so that its connection with the anchor rod is sheared off at a given anchoring load smaller than the load for which the anchoring device is dimensioned. Accordingly, the distance between the two nuts or the two nut portions is eliminated and the actual anchoring member establishes a force-locking connection with the anchor rod.

Accordingly, a substantial signal that the predetermined load has been exceeded is established when the spacing between the two nuts or two nut portions is eliminated, that is, when the spacing established by the cut in the nut portion is closed, and such closure can be easily observed visually from the exterior, even from a certain distance. Markings which are visibly perceptible without additional assistance, such as color markings, can be arranged on the anchor nut and/or at the cuts in order to make the closing of the cuts more clearly discernable. Since the force effecting a closing of the cut is very high, such force can also trigger various mechanisms or destructive processes for providing a signalling effect. For example, the closing force can cause an electric circuit to be short-circuited or a tube to be pinched so that a liquid runs out of it, or its continuity is reduced, o eliminated.

The particular advantage of the present invention is that a reliable, practicable and early warning system for overloading of the anchoring device is provided with conventional anchoring parts, without any appreciable expenditure in time or cost and with the security arrangement of the invention incorporated as a part of the over-all force transmission system. A significant feature of the invention for use at a construction site is that a roof or lock anchor equipped with the anchoring device in accordance with the invention can be installed in the same manner as standard roof or rock anchors since it is only necessary to thread the anchor nut onto the ribs on the anchor rod.

The various features of novelty which characterize the invention are pointed out with particularly in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the Drawing:

FIG. 5 is an end view of the anchor nut embodying the present invention, displayed on an enlarged scale;

FIG. 6 is a side view of the anchor nut taken along the line VI—VI in FIG. 5; and FIG. 7 is a side view of the anchor nut taken along the line VII—VII in FIG. 5.

DETAILED DESCRIPTION OF THE INVENTION

Figure 1:
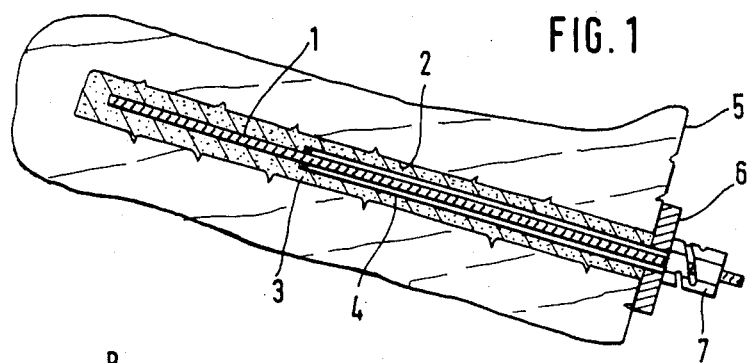
FIG. 1 is an axially extending sectional view of a rock anchor incorporating an anchoring device in accordance with present invention, with the device located on the exterior of the body or strata into which the anchor is installed.

FIG. 1 is an axially extending section through a rock anchor comprising an axially elongated anchor rod, inserted into a borehole 2 formed into a body of a strata of rock to be anchored. Borehole 2 extends for its axial length from the surface 5 to the base of the borehole with a hardenable material 3, such as a synthetic resin adhesive filling the borehole. As can be seen in FIG. 1, the leading portion of the anchor rod 1 is embedded and secured within the hardenable material 3 for a determined length. A jacket 4 laterally encloses the rod 1 from a location spaced axially from the leading end of the rod to the surface 5 of the body of rock. The jacket is arranged so that the hardenable material 3 does not enter between the jacket and the rod. As a result, for its axial length within the jacket 4, the anchor rod is freely expandable. Anchoring means for the anchor rod 1, include an anchor plate 6 bearing against the surface 5 of the rock and an anchor nut 7 in contact with the outwardly facing surface of the anchor plate 6 for securing the plate against the surface 5. The anchor nut 7 is described in greater detail in the following text.

Preferably, a hot-rolled steel rod, known per se, is used as the anchor rod 1, and its outside surface is provided with force transmission ribs 8, also hot-rolled.

Ribs 8 extend along a helical line on opposite sides of the rod, that is, they only extend for a portion of the circumference of the rod. As a result, the ribs form a partial thread or a discontinuous or interrupted thread on the surface of the anchor rod and the anchor nut 7 is provided with a corresponding female thread so that it can be screwed onto the thread formed by the ribs 8 on the anchor rod. It would be possible to provide the force transmission ribs 8 in the form of a continuous thread on the circumferential surface of the anchor rod 1.

One embodiment of the anchor nut 7 incorporating the present invention is displayed in particular in FIG. 5 to 7 on an enlarged scale.

Figures 2, 3:
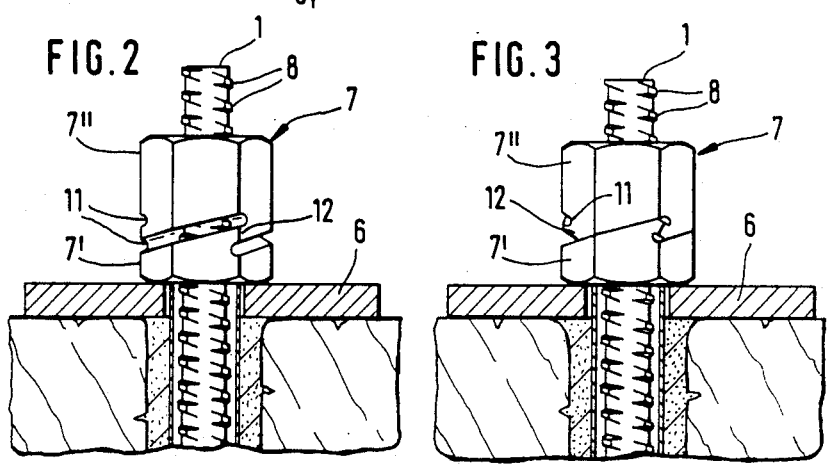
FIG. 2 is an enlarged sectional view of the anchor nut as shown in FIG. 1 before a predetermined anchoring force has been attained.
FIG. 3 is a view similar to FIG. 2, however, showing the anchor nut after the predetermined anchoring force has been reached.

Anchor nut 7 is formed of a lesser strength material than the material forming the anchor rod 1. Anchor, nut 7 is divided into a first portion 7' and a second portion 7'' by three cuts or slots 11 extending through the wall of the nut transversely of the central axis of the nut. As can be seen in FIGS. 2 and 3, the first portion 7' of the nut is located closer to the surface 5 of the strata into which the anchor rod is inserted, with the second portion being spaced more remotely from the strata. Anchor nut 7 has a full axial length L and the cuts 11 are formed so that the first portion 7' has a smaller length $L_1$ than the second portion 7'' which has a length $L_2$, note FIG. 6. As displayed in FIG. 7, the cuts are oriented at an acute angle $\beta$, relative to a plane perpendicular to the central axis of the nut 7, with the cuts extending in overlapping relation in their end regions. Accordingly, each cut 11 extends for somewhat more than 120° around the circumference of the nut. With the cuts extending completely through the nut wall, at the end regions of the cuts 11, only relatively small webs 12 remain in the axial direction between the overlapping ends ensuring during initial use of the nut that the first and second nut portions 7' and 7'' are connected to one another. The webs are formed, however, so that they provide predetermined breaking points between the nut portions when the anchor device is loaded in excess of a predetermined anchoring force.

As can be seen in FIG. 5, each of the cuts 11 extend at one angle $\alpha$ for approximately 120° around the circumference of the nut. As a result, the centers of the cuts in the circumferential direction are spaced 120° apart. The cuts through the anchor nut 7 extend along a circular arc with a radius R with the arc being spaced at a distance a from the central axis of the nut. In the end region of the cuts 11, the base 10 of the cuts are rounded, note FIGS. 6 and 7.

Anchor nut 7, formed in accordance with the present invention, is used for anchoring the trailing end of anchor rod 1 where it extends outwardly from the borehole 2 as shown in FIG. 2. When the anchor rod is initially loaded, only the first portion 7' of the nut 7, in contact with the outside surface of the anchor plate 6, supports the anchor rod. First portion 7' is dimensioned, that is, by means of the number and depth of its threads, so that it can only transmit a predetermined anchoring force, that is, a test force. If the strata or body of rock into which the anchor rod is inserted deforms to a degree so that the test force or the predetermined anchoring force is exceeded, then the threads of the first portion 7' of the nut are sheared off. At the same time, the narrow webs 12 between the overlapping ends of the cuts 11 are broken off and the opening established between the opposed surfaces of the cuts 11 close, note FIG. 3, and the second portion 7' of the anchor nut 7 moves into contact with the adjacent surface of the first portion 7', the second portion 7'' has a number of threads and depth of threads which affords greater strength than the first portion 7'. As can be noted from the comparison of FIGS. 2 and 3, there is relative movement between the first and second portions 7', 7'' of the anchor nut 7 when the predetermined anchoring force is exceeded.

Figure 4:
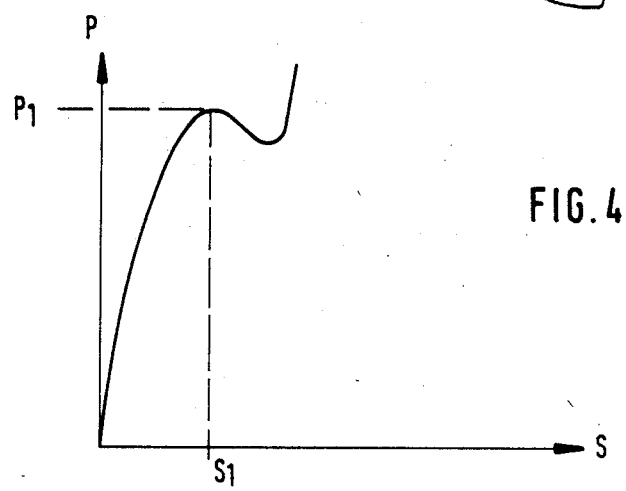
FIG. 4 is a graph showing the anchoring force P as a function of the deformation of the anchor nut.

In FIG. 4, a force-path diagram is shown indicating how the test load $P_1$ drops after the predetermined deformation $S_1$ occurs before the anchoring force P increases again during the force-locking engagement of the second portion 7'' of the anchor nut 7, following a slight drop in the anchoring force when the spacing between the nut portion is eliminated when the two portions move toward one another.

If two or more load stages are provided to indicate the urgency of clearing the construction site, it is possible to interconnect two or more nut portions ahead of the second nut portion 7' in a manner similar to that shown above, so that these portions are sheared off or displaced indicating by the elimination of the spaces between them when the given test load has been exceeded.

While specific embodiment of the invention have been shown and described in detail to illustrate the application of the inventive principles, it will be understood that the invention may be embodied otherwise without departing from such principles.

We claim:

1. Anchoring device such as a rock anchor and the like, including a tension member, said tension member comprises and axially extending steel anchor rod having an axially and circumferentially extending outside surface with ribs extending helically along and projecting outwardly from the outside surface, said ribs forming at least a partial thread on said anchor rod, an unitary anchor nut having a central axis coaxial with the axis of said anchor rod and threadedly engageable on said ribs on said anchor rod, said anchor nut having a first end and a second end spaced apart in the axial direction with the first end arranged to face toward a body into which said anchor rod is inserted and said second end facing in the opposite direction, the first end of said anchor nut arranged to be supported against the body into which the anchored rod is inserted, said anchor nut has at least two portions extending in the central axis direction and each portion has an internal thread for threaded engagement with said anchor rod, said portions being spaced apart at a given dimension in the central axis direction and being arranged to rotate as a unit, said portions being displaceable in the central axis direction relative to one another free of rotational movement therebetween by the given distance when a predetermined anchoring force acting on the anchoring device is exceeded so that said portions achieve a force-locking engagement with the rod one after the other and the displacement by the given distance affords an indication that the predetermined anchoring force has been exceeded, said portions comprise a first portion extending from the first end toward the second end and a second portion extending from the second end toward the first end, at least said first portion is formed of a material having a lower strength than material forming said anchor rod, said first portion having a dimension in the central axis direction that it loses its force-locking engagement with said ribs on said anchor rod when the predetermined anchoring force is exceeded whereby the anchoring force is transmitted to at least said second portion.

2. Anchoring device, as set forth in claim 1, wherein said first portion of said anchor nut has fewer threads than said second portion and any other portions located therebetween, and said threads in said first portion are sheared off when the predetermined force is exceeded.

3. Anchoring device, as set forth in claim 2, wherein said first portion of said anchor nut has a smaller dimension in the central axis direction than said second portion.

4. Anchoring device, as set forth in claim 1, wherein said anchor nut is formed monolithically with said first and second portions being interconnected by predetermined breaking sections for fixing the spacing at the given distance between said first and second portions, and cuts formed in said nut and extending in the circumferential direction thereof transversely of the central axis thereof for spacing said first and second portions.

5. Anchoring device, as set forth in claim 4, wherein three said cuts are formed in said anchor nut extending therethrough for approximately 120° in the circumferential direction of said anchor nut with said cuts extending at an acute angle relative to a plane perpendicular to the central axis of said anchor nut whereby the adjacent ends of said cuts overlap one another by a spacing determined by the axial dimension of said cuts.

6. Anchoring device, as set forth in claim 5, wherein said cuts are formed through said nut extending along a circular arc with the center of the circular arc being spaced from and adjacent to the central axis of the anchor nut.

* * * * *